Patented Oct. 30, 1934

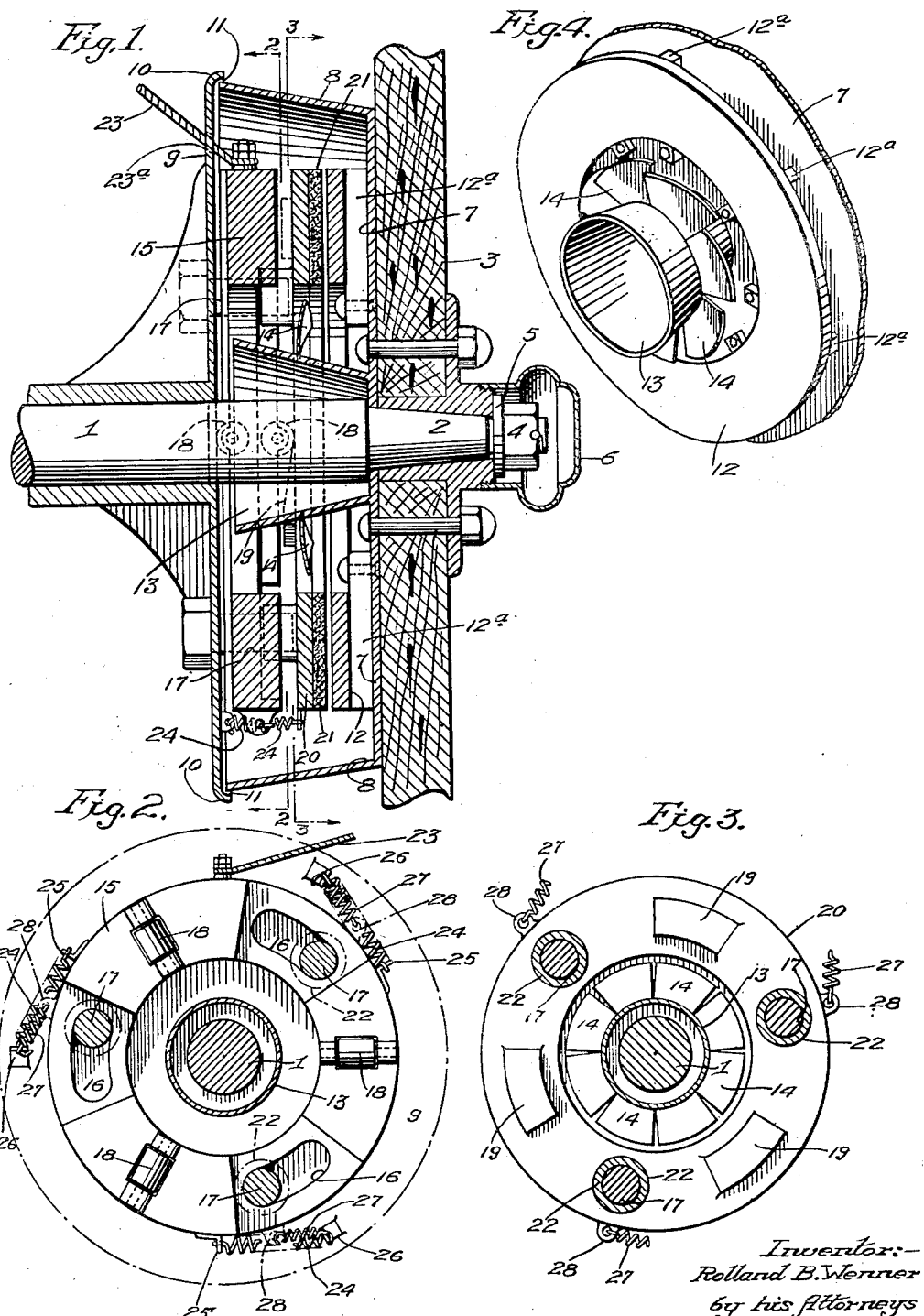

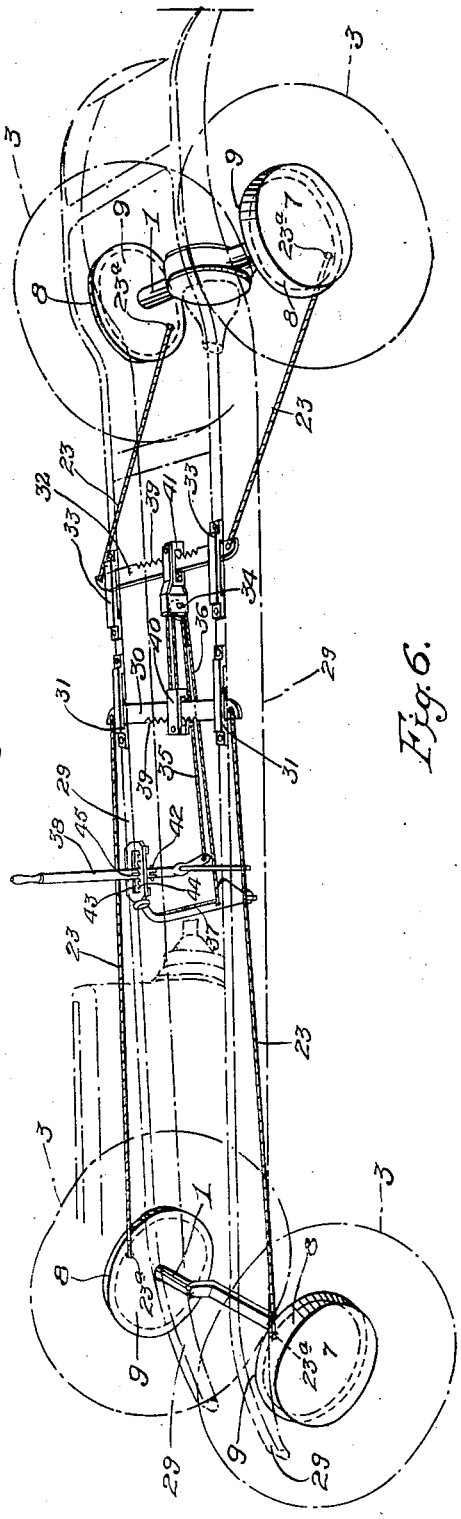

1,979,181

UNITED STATES PATENT OFFICE 1,979,181

DIRECT DISK BRAKING DEVICE

Rolland B. Wenner, Wilson Borough, Pa., assignor to Easton Trust Company, Easton, Pa., a corporation of Pennsylvania Application November 8, 1932, Serial No. 641,723

8 Claims. (Cl. 188—72)

This invention relates to new and useful improvements in vehicle brakes and more particularly to that known as the direct disk type of brake.

The principal object of the invention is to provide a brake of the character set forth which is novelly constructed to insure maximum braking efficiency under any and all operating conditions.

Another object of the invention is to provide a brake of the stated character wherein means is provided to effectually maintain the operating parts thereof substantially free from foreign substances such as water, grease and dirt.

Another object of the invention is to provide a brake as set forth having means operable to prevent warping of the braking disks and insure true parallel contact thereof at all times.

A more specific object of the invention is to provide a brake mechanism of the character set forth having means operable to expel dirt, grease and other foreign substance from said mechanism, said means including a revoluble cone section, having an air agitator or exciter arranged on its outer surface.

A further object of the invention is to provide a braking mechanism as set forth including means operable to apply each of the brakes on a vehicle irrespective and independently of any other brake operated by said brake-applying means.

These and other objects as well as the features and details of construction of the invention are set forth hereinafter and shown in the accompanying drawings, in which:

Fig. 1 is a view in section axially through a brake mechanism constituting this invention;

Fig. 2 is a small view in section on line 2—2 of Fig. 1;

Fig. 3 is a view similar to Fig. 2 on line 3—3 of Fig. 1;

Fig. 4 is a detached view in perspective of the means for expelling foreign matter from the interior of the brake;

Fig. 5 is a view in perspective of the brake-applying mechanism rigged in the frame of a motor vehicle; and Fig. 6 is an enlarged fragmentary view in perspective showing the adjustable features of brake-applying mechanism.

Referring now more particularly to the drawings, reference numeral 1 designates the customary vehicle axle provided at its end with a tapered portion 2 constituting a spindle on which wheel 3 is rotatably mounted. The wheel 3 is retained on the spindle 2 by means of a lock nut 4 and washer 5 in the customary manner and these are covered over by a cap or other ornamental device such as is indicated at 6 in Fig. 1.

Rigidly secured to the inner face of the wheel 3, and rotatable therewith, is a cup-like casing member 7, the sides of which diverge away from the wheel as indicated at 8. A cover or closure member 9 for the casing 7 is fixedly secured with respect to the wheel 3 and casing 7, and as shown in Fig. 1 of the drawings, the periphery or circumferential edge 10 of said closure member 9 is bent over the inner circumferential edge of the sides 8 of the casing 7 in spaced relation thereto as at 11, the purpose for which space will be set forth hereinafter. An annular disk 12 is permanently secured to the inner face of the casing member 7 and is spaced therefrom by webs or lugs 12—a which are made integral with said disk 12 and function to reinforce the disk and preclude any tendency of the latter becoming warped due to the generation of heat as a result of friction.

A cone section 13 is likewise permanently secured to the inner face of the casing member 7, and extends laterally from the wheel 3 through the opening in the annular disk 12, the said cone section having its smaller end connected to said wheel so that the side surface thereof diverges laterally from said wheel 3. An air agitator or exciter 14 in the form of a circular ring of blades is disposed on the circumference of the cone section 13. The cone section 13 and the exciter 14, which rotate with the casing member 7 and the wheel 3 about the axle 1, function in a manner forming the principal feature of the present invention and the operation thereof will be set forth more in detail hereafter.

An annular disk 15 is mounted for rotation about the axle 1 with respect to the casing cover member 9 and is provided with a number of spaced circumferentially-disposed slots 16 therein which are arranged for slidable engagement by a corresponding number of suitably positioned lugs 17 which extend laterally from the inner face of the cover 9 in the direction of the wheel 3. The lugs 17, which engage the slots 16, slidably support the disk 15 in a predetermined position circumferentially of the axle 1 and the arcuate length of each of said slots 16 cooperates with the lugs 17 to limit rotation of said disk 15 about the axle 1.

A number of rollers 18 are mounted circumferentially of the disk 15 between the spaced slots 16 previously described, and these rollers 18 on one side of the disk 15 ride upon the adjacent face of the cover member 9 and at the other side of said disk 15 are arranged to ride upon inclined arcuate cam surfaces 19 formed on the adjacent face of an axially slidable disk 20 which is provided on its opposite face with an annular friction member or strip 21, arranged for contact with the adjacent face of the previously mentioned disk 12. A number of sockets 22, correspondingly positioned with respect to the lugs 17, project laterally from the disk 20 and are engaged by the ends of said lugs 17, which permits movement of the disk 20 axially with respect to the axle 1 but prevents rotation of said disk circumferentially thereof. With the disk so mounted, and predeterminedly positioned by means of the previously described lugs and sockets, the inclined cam surfaces 19 are positioned circumferentially of the inner face of said disk so as to cooperate with the rollers 18 mounted in the disk 15 in such manner that when said disk 15 is rotated through a portion or all of the arc limited by the slots 16, the said rollers 18 will ride up the inclined surface of said cams 19 and move the friction disk 20 axially of the axle 1 in the direction of the rotating disk member 12. In the present instance, the cams 19 are arcuate in form and the length of the incline thereof is substantially equal to the arcuate length of the slots 16 in the disk 12 which limit rotation of the latter and prevent the rollers 18 mounted therein from overriding the high point of said cam elements. Preferably, the maximum height of the cams 19 is substantially equal to the thickness of the friction strip 21 mounted on the opposite face of the disk 20 and it is pointed out that this relationship of height and thickness respectively of the cam and friction strip is desirable in order to secure maximum frictional contact of the friction strip with the rotating disk 12 as said strip decreases in thickness as a result of wear from contact with said disk.

A cable, or other actuating mechanism 23, such as a lever, extends through an opening 23a in the cover member 9 of the casing and is connected to the actuating disk 15 to impart rotation to the latter circumferentially of the axle 1. In order that the disk 15 may be returned to its initial position as each arcuate movement thereof is effected by means of the cable 23, a plurality of tension elements 24 in the form of springs are connected at one end to lugs 25 formed on the circumference of said disk 15 and at their other ends to lugs 26 formed on the inner or adjacent face of the casing closure member 9. In a similar manner, and to retract the friction disk axially of the axle 1 away from the rotating disk 12 as the disk 15 returns to its initial position, a number of tension elements 27 in the form of springs are connected at one end to lugs 28 formed on the friction disk 20 and at their other ends to the lugs 26 previously described.

Each of the disks 15 and 20 are annular in shape and are disposed circumferentially of the diverging cone section 13 which extends inwardly of the casing 7 from the vertical wall thereof.

A particular feature of the invention resides in the provision of the cone section and the agitating or exciting blades 14 disposed circumferentially of the latter. It is well known that in order to obtain maximum braking efficiency at all times in devices of this type it is necessary that the operative elements thereof be maintained positively free from foreign matter such as dirt, grease and water. By provision in the present mechanism of the cone section 13 and the agitators 14, as shown, foreign substances which, perchance, find their way to the interior of the brake mechanism and contact the rapidly rotating diverging surface of said cone section 13 are impelled radially or tangentially from the surface thereof and expelled or driven outwardly from the casing through the space 11 provided intermediate the edge of the casing sides 8 and the overlapping adjacent edge 10 of the casing closure member 9.

As is customary in the majority of present-day motor vehicles, each wheel 3 thereof is equipped with a brake mechanism. Accordingly, it is contemplated by this invention to provide means for applying each of such brakes including an arrangement whereby each of the brakes will retard movement of the vehicle with a predetermined uniform braking force and further enable application of each brake independently and irrespective of the others. The arrangement also includes means adjustable at will to vary the relative braking effect of each one of the front and rear pairs of brakes.

Referring particularly to Fig. 5 of the drawings, 29 designates the customary frame structure of a motor vehicle having front and rear axles 1, 1, each of which is provided with a brake of the particular type herein set forth. In the present instance the actuating cable 23 from each brake mechanism on the front axle 1 is connected to the adjacent end of a cross member 30 slidably mounted transversely of the longitudinal axis of the frame 29, said cross piece 30 being limited in its movement longitudinally of said frame by means of stops 31. In a similar manner, the operating cables 23 of the rear brakes are connected to the adjacent ends of a sliding cross piece 32 also limited in movement longitudinally of the frame by stops 33. A pair of rollers 34, 34 are mounted at the center of the latter cross piece 32 at the forward edge thereof and cables 35 and 36 connected respectively to the foot and emergency brake levers 37 and 38 extend rearwardly of the vehicle frame 29, pass about said rollers toward the front of the vehicle and are connected to the forward cross piece 30 at the longitudinal center thereof as shown in the drawings. In each instance the cross members 30 and 32 are provided with a plurality of notches 39 along adjacent edges thereof and these notches are arranged for engagement by fulcrums 40 and 41 positioned intermediate the side channels of the frame 29. The relative positions of the cross pieces 30 and 32 longitudinally of the frame are such that when either of the levers 37 and 38 are actuated the cross piece 32 will be moved to apply the rear wheel brakes a short time before the front cross piece 30 is actuated to apply the front wheel brakes. This lagging application of the front wheel brakes also depends upon the relative differences in tension strength of the brake-releasing or return springs 24 in the front and rear wheel braking devices.

By means of the notches 39 and fulcrums 40 and 41 provided for each of the cross pieces 30 and 32, the pull on the cable 23 to each brake of the pair actuated by each cross piece may be varied from time to time to compensate for differences in the wear of the friction strips 21 so that the actual retarding force set up by each brake of that pair will be substantially equal.

It will be noticed that by the present arrangement of the cross members 30 and 32 and the relative positions of their stops 31 and 33 respectively, any one or all but one of the brake mechanisms may become inoperative and yet not preclude application of the remaining operable brake or brakes to retard or stop movement of the vehicle.

In the present instance the emergency or hand brake lever 38 comprises two sections pivotally connected to each other by means of a swivel joint 42 which permits movement of the upper section thereof transversely within an elongated slot 43 of the usual ratchet member 44. A pawl 45 is carried by the upper emergency brake section and arranged to engage the teeth of the ratchet 44 as shown in Fig. 5 of the drawings.

It is pointed out that the warp-preventing lugs or braces 12—a may be made integral with the disk 12 or not as may be desired without loss of their effectiveness in the manner intended. Furthermore, the function of the cone section 13 to expel foreign substances from the brake is almost equally as effective to that end when not provided with the agitator blades 14 as when so equipped.

While specific structure has been disclosed for the purpose of description, it is not intended that the invention be precisely limited thereto except such as is not within the scope of the appended claims.

I claim:

1. In a braking mechanism the combination with a wheel arranged for rotation, of a cup-shaped casing member rotatable with said wheel, having its sides diverging therefrom, another casing member fixed with respect to and overlying the periphery of the first casing member in spaced relation therewith, a disk, means for securing said disk to the first casing in spaced relation thereto to prevent warping and maintain the same substantially perpendicular to the axis of the shaft, an annular friction disk parallel to said first disk and movable into and out of contact with said first disk, means operable to actuate the friction disk into parallel contact with the first disk, and an inwardly diverging sleeve rotatable with the first disk internally of the second, arranged to drive dirt and grease radially from the brake through the space between the first and second casing members, to enable maximum efficiency in retarding relative rotation of the parallel disks when the brake is applied.

2. In a vehicle the combination with an axle, and a wheel mounted adjacent each end thereof and arranged for rotation, of a cup-shaped casing member rotatable with said wheels having its sides diverging therefrom, another casing member fixed with respect to and overlying the periphery of the first casing member in spaced relation therewith, a disk, means for securing said disk to the first casing in spaced relation thereto to prevent warping and maintain the same substantially perpendicular to the axis of the shaft, a friction disk parallel to said first disk and movable into and out of contact with said first disk, means operable to actuate the friction disk into contact with the first disk, means operatively associated with said disk actuating means to effect application of each of said brakes independently and irrespective of the application of the other, and an inwardly diverging sleeve rotatable with the first disk internally of the second, arranged to drive dirt and grease radially from the brake through the space between the first and second casing members, to enable maximum efficiency in retarding relative rotation of the parallel disks when the brake is applied.

3. In a braking mechanism, the combination with a wheel arranged for rotation, of a cup-shaped casing member rotatable with said wheel and having its sides diverging therefrom, a relatively fixed casing member extending adjacent the periphery of the first casing member and spaced with respect thereto, and an inwardly diverging sleeve rotatable with the first casing arranged to expel dirt and grease from the brake radially through the space between the first and second casing members.

4. In a braking mechanism, the combination with a wheel arranged for rotation, of a cup-shaped casing rotatable with said wheel, having its sides diverging therefrom, a relatively fixed casing member extending adjacent the periphery of the first casing member in spaced relation with respect thereto, a disk rotatable with the first casing, a friction disk parallel to said first disk and movable into and out of contact with the first disk, and an inwardly diverging sleeve rotatable with the first disk arranged to expel dirt and grease from the brake radially through the space between the first and second casing members to effect maximum braking efficiency in retarding relative rotation of said disks.

5. In a braking mechanism, the combination with a wheel arranged for rotation, of housings including a stationary and a rotatable member in spaced relation with respect to each other, and an inwardly diverging member fixed to the rotatable housing member arranged to expel dirt and grease from the brake radially through the space between said housing members.

6. In a vehicle, the combination with an axle and a wheel mounted adjacent each end thereof and arranged for rotation, of a casing member rotatable with each of said wheels, a disk, means intermediate the center and periphery of said disk for securing the disk to the casing in spaced relation with respect thereto to prevent warping and maintain the same substantially perpendicular to the axis of the axle, a friction disk parallel to said first disk, means operable to actuate the friction disk into parallel contact with the first disk, means operatively associated with said actuating means to effect application of each of said brakes independently and irrespective of the application of the other, and means rotatable with respect to said friction disk arranged to expel dirt and grease from the brake to effect maximum brake efficiency in retarding relative rotation of the disks when the brake is applied.

7. In a braking mechanism, the combination with a wheel arranged for rotation, of a disk rotatable with said wheel, a friction member arranged to contact said disk, and means rotatable with respect to said friction member arranged to expel foreign substances from said mechanism to effect maximum braking efficiency in retarding relative rotation of the disk and friction member.

8. In a braking mechanism, the combination with a wheel arranged for rotation, of a housing rotatable with said wheel, a disk, means for securing the disk to the housing in spaced relation with respect thereto to prevent warping and maintain the same substantially perpendicular to the axis of rotation of the wheel, a friction member arranged to contact said disk, and means rotatable with respect to said friction member arranged to expel foreign substances from said mechanism to effect maximum braking efficiency in retarding relative rotation of the disk and friction member.

ROLLAND B. WENNER.